(12) United States Patent
Sim et al.

(10) Patent No.: US 8,749,938 B2
(45) Date of Patent: *Jun. 10, 2014

(54) FAULT CURRENT LIMITER

(75) Inventors: Jung Wook Sim, Cheongju-si (KR); Won Joon Choe, Cheongju-si (KR); Gyeong Ho Lee, Cheongju-si (KR); Seung Hyun Bang, Busan (KR); Hae Yong Park, Masan-si (KR); Min Jee Kim, Seoul (KR)

(73) Assignee: LSIS Co., Ltd., Anyang-Si, Gyeonggi-Do (KR)

(*) Notice: Subject to any disclaimer, the term of this patent is extended or adjusted under 35 U.S.C. 154(b) by 18 days.

This patent is subject to a terminal disclaimer.

(21) Appl. No.: 13/543,741

(22) Filed: Jul. 6, 2012

(65) Prior Publication Data

US 2013/0021706 A1 Jan. 24, 2013

(30) Foreign Application Priority Data

Jul. 22, 2011 (KR) .................. 10-2011-0073239

(51) Int. Cl.
*H02H 9/08* (2006.01)

(52) U.S. Cl.
USPC ........................................ 361/93.9; 361/13

(58) Field of Classification Search
USPC ...................................................... 361/13
See application file for complete search history.

(56) References Cited

U.S. PATENT DOCUMENTS

| | | | |
|---|---|---|---|
| 3,723,815 A | 3/1973 | Ambler et al. | |
| 5,650,901 A * | 7/1997 | Yamamoto | 361/8 |
| 6,608,470 B1 * | 8/2003 | Oglesbee et al. | 320/136 |
| 8,335,060 B2 * | 12/2012 | Bang et al. | 361/2 |
| 2002/0116092 A1 * | 8/2002 | Hamamatsu et al. | 700/295 |
| 2002/0158633 A1 * | 10/2002 | Baumgaertl et al. | 324/424 |
| 2009/0147412 A1 * | 6/2009 | Kojovic et al. | 361/36 |
| 2011/0007432 A1 | 1/2011 | Barber | |
| 2012/0299393 A1 * | 11/2012 | Hafner et al. | 307/113 |
| 2013/0021706 A1 * | 1/2013 | Sim et al. | 361/93.9 |

FOREIGN PATENT DOCUMENTS

| | | |
|---|---|---|
| JP | 2000133099 | 5/2000 |
| JP | 2004266978 | 9/2004 |
| JP | 2009050140 | 3/2009 |
| KR | 10-2011-0035758 | 4/2011 |
| KR | 10-1044492 | 6/2011 |
| WO | 2011/057675 | 5/2011 |

OTHER PUBLICATIONS

Korean Intellectual Property Office Application Serial No. 10-2011-0073239, Office Action dated Jul. 16, 2012, 4 pages.
European Patent Office Application Serial No. 12174401.5, Search Report dated Nov. 19, 2012, 7 pages.
Japan Patent Office Application Serial No. 2012-161705, Office Action dated Sep. 17, 2013, 3 pages.

* cited by examiner

*Primary Examiner* — Rexford Barnie
*Assistant Examiner* — Angela Brooks
(74) *Attorney, Agent, or Firm* — Lee, Hong, Degerman, Kang & Waimey

(57) ABSTRACT

Provided is a fault current limiter, the limiter including a detector detecting an inflow of a fault current and transmitting a turn-on signal to a first switch and transmitting a turn-off signal to a power semiconductor element, the power semiconductor element changed to an OFF state by the turn-off signal, the first switch forming a current limiting circuit by being switched to an ON state by the turn-on signal, and a resistance element blocking the fault current, wherein the series connection between the resistance element and the first switch is connected in parallel to the power semiconductor element.

7 Claims, 9 Drawing Sheets

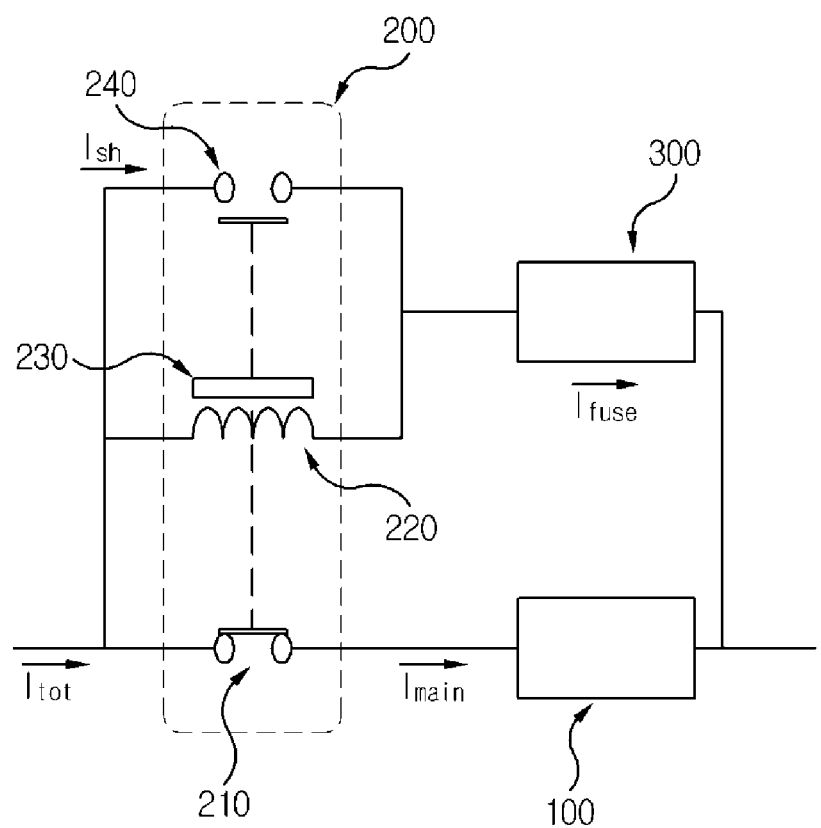

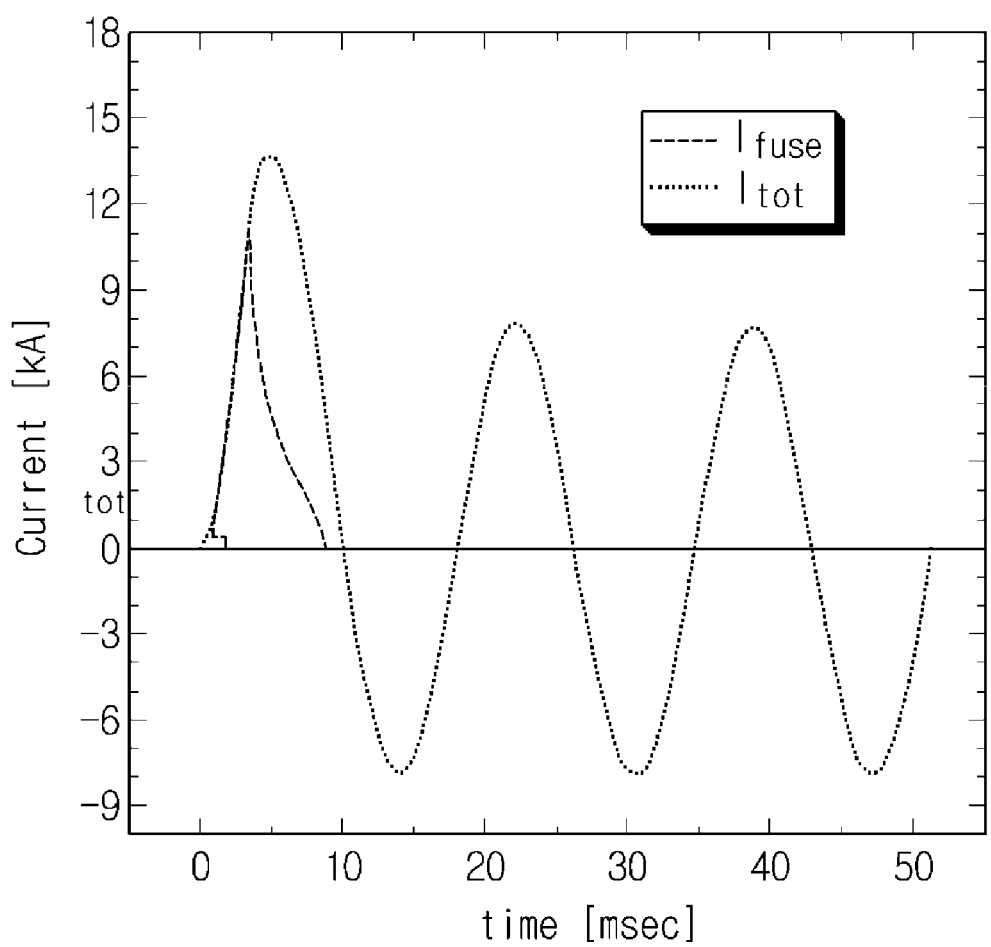

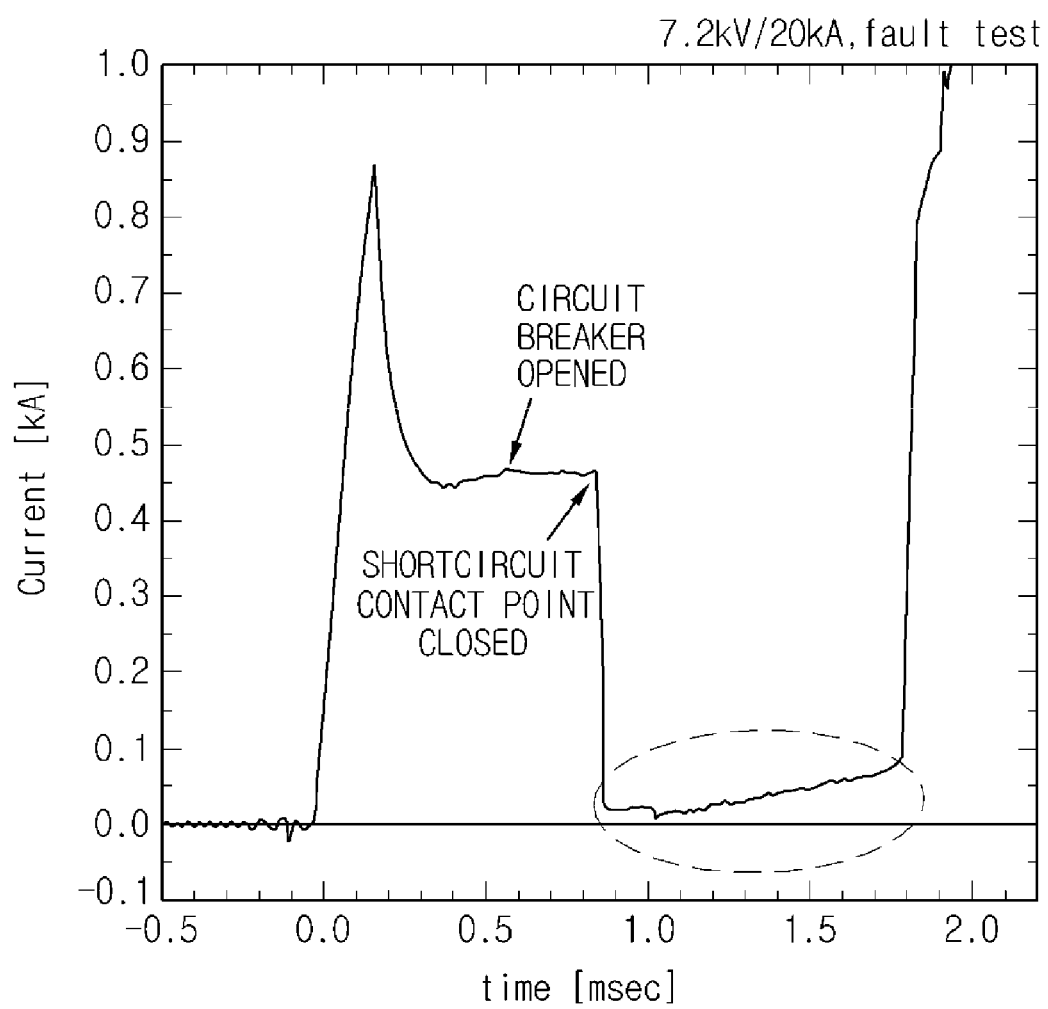

FAULT CURRENT LIMITER

Pursuant to 35 U.S.C. §119 (a), this application claims the benefit of earlier filing date and right of priority to Korean Patent Application No.10-2011-0073239, filed on Jul. 22, 2011, the contents of which is hereby incorporated by reference in their entirety.

BACKGROUND OF THE DISCLOSURE

1. Field of Endeavor

The present disclosure relates to a fault current limiter, and more particularly to a fault current limiter used in electric power systems.

2. Background

A fault current limiter is a means of detecting a fault current generated by lightning, grounding and short-circuit and limiting the current to a normal level within several seconds, using a superconductor as a current limiting device which has substantially no resistance until certain up to a predetermined current value but rapidly represents a high resistance over a predetermined current value to limit the conducting current.

The fault current limiter is concentrated with a huge amount of energy due to resistance generated by the superconductor, such that energy consumption of the superconductor increases as the voltage applied to the superconductor increases.

That is, a superconductor exhibits zero resistance during its normal operation state in a system, however, when a fault current flows in the system, the superconductor is quenched to produce resistance which limits the fault current. At this time, the resistance may cause considerable energy to be applied to the current limiter. As a voltage applied to the system that runs the superconductor is high, the energy flowing in the superconductor correspondingly increases due to the impedance produced at the superconductor. Accordingly, lots of superconductors are needed to distribute the energy.

Thus, to minimize the energy consumption of the superconductor, a large number of the superconductors is needed which leads to increasing the manufacturing cost, and a total volume increases in accordance with use of huge number of superconductors, thereby increasing the installation and cooling cost.

That is, the superconductor is expensive in price and lots of superconductors mean large volume, which may increase the costs for installing and cooling the superconductor. To overcome the above problems, a hybrid-type superconducting fault current limiter (SFCL) including an existing circuit breaking means and a small number of superconductors has been disclosed. But the suggestion has failed to solve the price problem. As capacity of the resistive superconducting fault current limiter becomes large, size of the linear coils and number of windings have to be increased thereby to have a disadvantage in cost and operation.

FIG. 1 is a circuit diagram illustrating a structure of a hybrid-type superconducting fault current limiter according to prior art, FIG. 2a is a current graph of the hybrid-type superconducting fault current limiter of FIG. 1, FIG. 2b is a graph illustrating an operation start time of the hybrid-type superconducting fault current limiter of FIG. 1, FIG. 2c is a graph illustrating an arc current in the hybrid-type superconducting fault current limiter of FIG. 1, and FIG. 2d is a current graph of the hybrid-type superconducting fault current limiter where electric arc was not blocked by the main circuit of the fault current limiter.

Referring to FIGS. 1 and 2, an electric current $I_{tot}$ passes through the closed circuit breaker 210 and superconductor 100 ($I_{main}$) during a normal operation state without any fault, so that loss caused by occurrence of resistance is substantially '0'. However, in a case where a fault current ($I_{fuse}$) flows into the circuit, the superconductor 100 starts to be quenched (A) at a very high speed, and the fault current ($I_{fuse}$) bypasses to the driving coil 220 due to impedance developed at the superconductor 100.

At this time, a magnetic field is generated by the current flowing into the driving coil 220, and an eddy current having a diamagnetic component is induced at an electromagnetic repeller 230 located over the driving coil 220.

Accordingly, the repeller 230 moves fast and opens a circuit breaker 210 mechanically linked with the repeller 230 thereby to cut off the inflow of the fault current into the superconductor 100 (B).

However, in the fault current limiter thus configured, the minute that the circuit breaker 210 is open, an arc current occurs across the circuit breaker 210, which causes the fault current to continue flowing into the superconductor 100. To eliminate the arc current, the fault current limiter is designed to close a short contact 240 that is mechanically linked with the electromagnetic repeller 230 (C).

That is, the whole fault current is transferred through the short contacts 240 to an auxiliary circuit, and therefore, the arc current across the circuit breaker 210 is eliminated (D) and then the fault current is transferred to the auxiliary circuit and reduced by the current limiting unit 300 (E).

However, in the course of limiting the fault current thus explained, the electric arc occurring across the circuit breaker 210 that is connected in series with the superconductor 100 may not be sufficiently removed before the current limiting unit 300 starts to operate due to difference in impedance between a main circuit formed with the superconductor 100 and the high-speed switch and the current limiting unit 300-formed auxiliary circuit that functions to limit the current (F).

Accordingly, an electric arc (arc current) is reproduced across the circuit breaker 210 due to the difference in impedance between the main circuit and the auxiliary circuit (G), which can reduce the arc impedance, so that the fault current can go through the superconductor 100 that changes into a normal conductive state and the circuit breaker 210 that becomes conductive due to the electric arc. At this time, most of voltage is applied to the superconductor 100 that is in a normal conductive state, so that the fault energy may flow into the superconductor 100, thereby damaging the superconductor 100.

FIG. 3 is a circuit diagram illustrating a hybrid-type superconducting fault current limiter according to prior art, proposed to solve the aforementioned problems, where a power semiconductor element 400 is added thereto. The power semiconductor element 400 is added to the main circuit to block an arc current generated after the superconductor 100 is quenched.

However, the fault current limiter according to FIG. 3 also fails to solve the problems, because superconductors are employed and the number of superconductors must be adjusted to adjust the operating current to thereby increase the costs for installing and cooling the superconductor and to reduce convenience in manipulation.

SUMMARY OF THE DISCLOSURE

The present disclosure has been made to solve the foregoing problem(s) of the prior art, and therefore an object of certain embodiments of the present invention is to provide a fault current limiter configured to easily remove a fault current present therein.

In one general aspect of the present disclosure, there is provided a fault current limiter, the current limiter comprising: a detector detecting an inflow of a fault current and transmitting a turn-on signal to a first switch and transmitting a turn-off signal to a power semiconductor element; the power semiconductor element changed to an OFF state by the turn-off signal; the first switch forming a current limiting circuit by being switched to an ON state by the turn-on signal; and a resistance element blocking the fault current, wherein the series connection between the resistance element and the first switch is connected in parallel to the power semiconductor element.

Preferably, but not necessarily, the fault current limiter further comprises a second switch connected to the power semiconductor element in series to open a contact point therein, in a case the fault current is introduced, and to protect the power semiconductor element against the fault current.

Preferably, but not necessarily, the serial connection between the second switch and the power semiconductor element is connected in parallel to the serial connection between the first switch and the resistance element.

Preferably, but not necessarily, the detector transmits an open signal to the second switch, where the second switch is opened by the open signal.

Preferably, but not necessarily, the fault current limiter further comprises a measurement unit measuring an inflow current, and the detector detects the inflow of fault current from a current measured by the measurement unit.

Preferably, but not necessarily, the measurement unit includes a current transformer and a Rogowski coil.

Preferably, but not necessarily, the fault current limiter further comprises a first power fuse connected to the resistance element in parallel to temporarily cut off the fault current introduced.

Preferably, but not necessarily, the fault current limiter further comprises a second power fuse connected to the resistance element in series to cut off a fault current passing the resistance element.

Preferably, but not necessarily, the detector transmits the turn-on signal prior to the open signal.

Preferably, but not necessarily, the detector transmits the open signal prior to the turn-off signal.

Preferably, but not necessarily, the power semiconductor element includes any one of an integrated gate communicated thyristor (IGBT), a gate turn-off thyristor (GTO), and an insulated gate bipolar transistor (IGCT).

Preferably, but not necessarily, the first switch includes any one of an SCR (Silicon Controlled Rectifier) and a contact type contact point.

The fault current limiter according to the present disclosure has an advantageous effect in that the fault current limiter is configured by removing superconductors and employing a power semiconductor element, whereby it is easy to control the fault current limiter and reliable fault current detection is enabled using a high speed fault detector.

The fault current limiter according to the present disclosure has another advantageous effect in that a power fuse is used to initially limit a fault current, and the fault current is secondly limited using a resistor, whereby the fault current can be limited more perfectly, and an SCR is employed for the fault current limiter to prevent a current from being introduced into the fault current limiter in a case where a normal current flows.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which:

FIG. 1 is a circuit diagram illustrating a structure of a hybrid-type superconducting fault current limiter according to prior art;

FIG. 2a is a current graph of the hybrid-type superconducting fault current limiter of FIG. 1;

FIG. 2d is a current graph of the hybrid-type superconducting fault current limiter where electric arc current is not blocked;

DETAILED DESCRIPTION

Figure 2B:
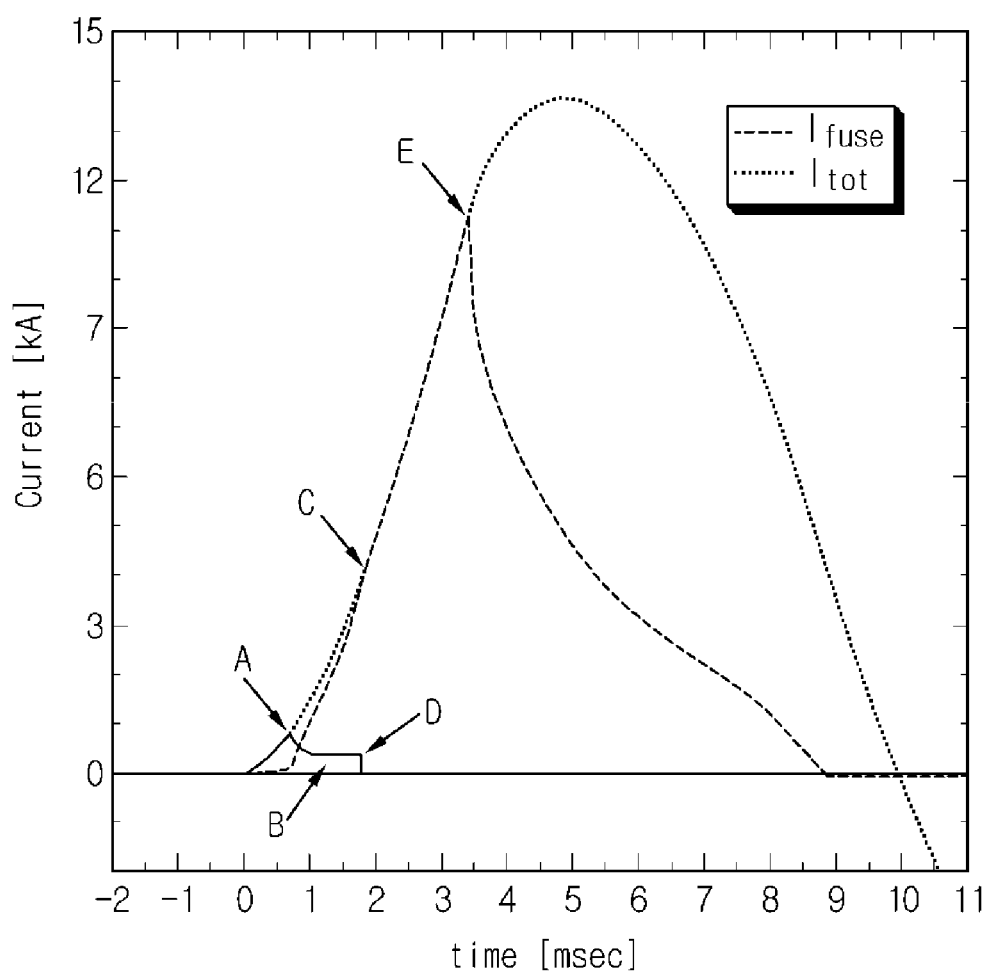
FIG. 2b is a graph illustrating an operation start time of the hybrid-type superconducting fault current limiter of FIG. 1.
Figure 2C:
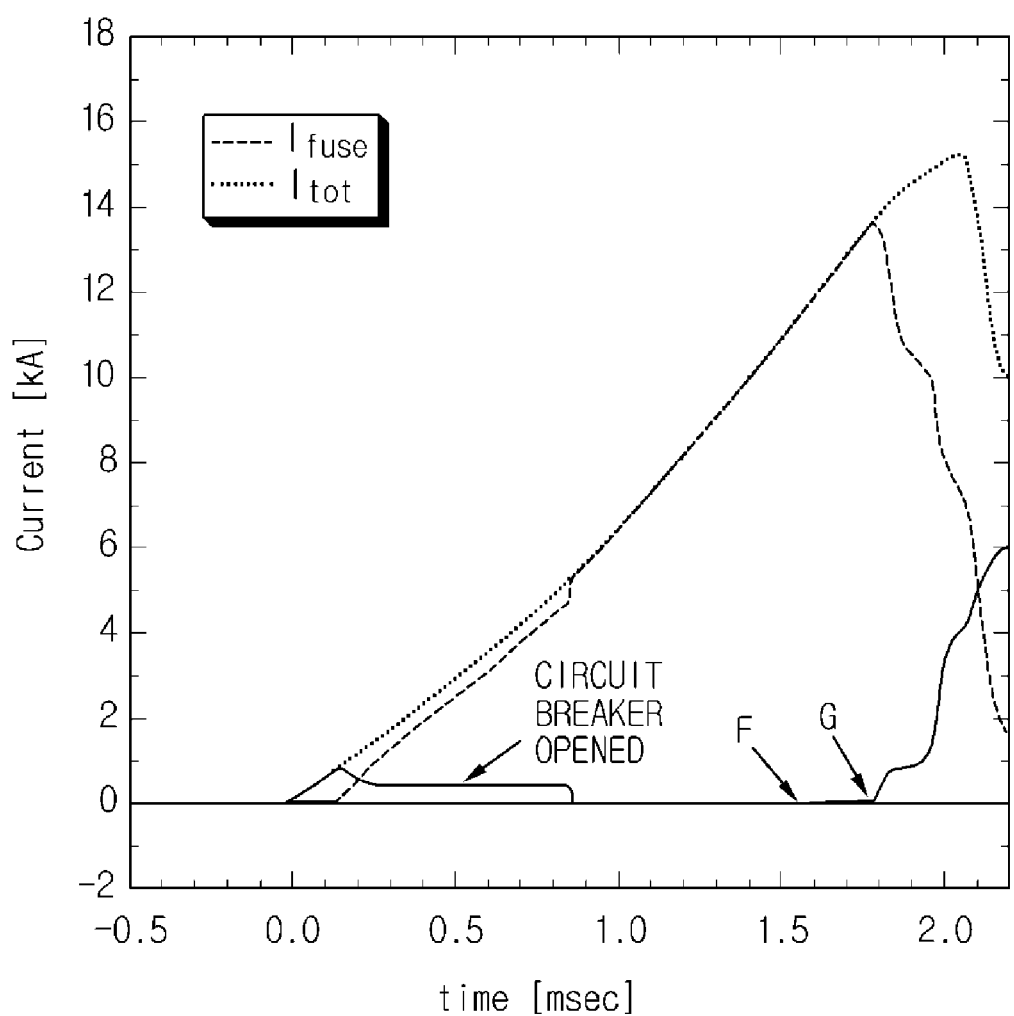
FIG. 2c is a graph illustrating an arc current in the hybrid-type superconducting fault current limiter of FIG. 1.
Figure 3:
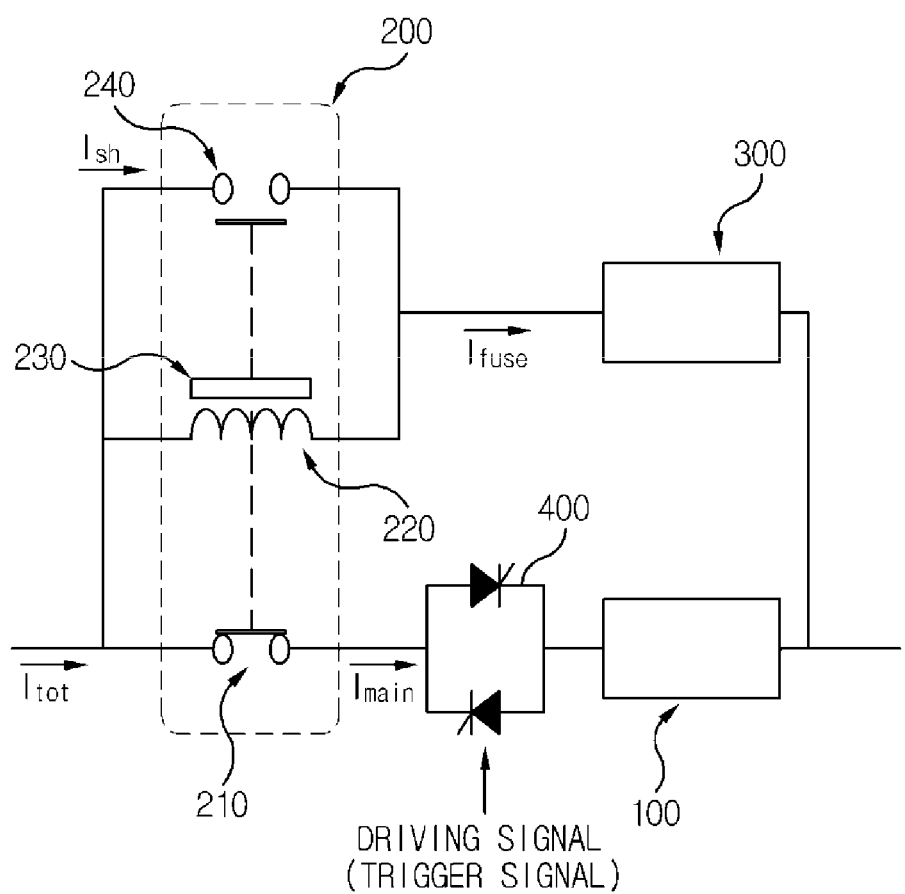
FIG. 3 is a circuit diagram illustrating a hybrid-type superconducting fault current limiter according to prior art.

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first," "second," and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, a fault current limiter according to the present disclosure will be described in detail with reference to the accompanying drawings.

Figure 4:
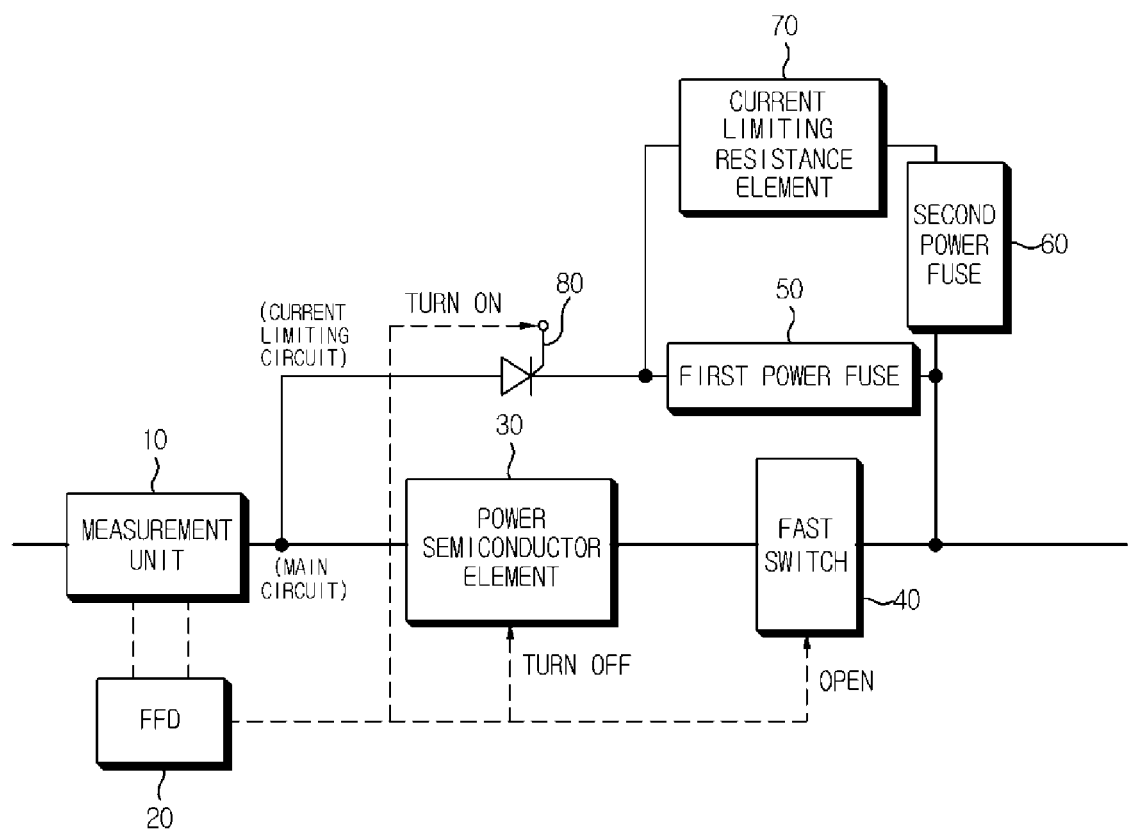
FIG. 4 is a block diagram illustrating a fault current limiter according to the present disclosure.

FIG. 4 is a block diagram illustrating a fault current limiter according to the present disclosure.

Referring to FIG. 4, a fault current limiter comprises a measurement unit (10), an FFD (Fast Failure Detector, 20), a power semiconductor element (30), a fast switch (40), first and second power fuses (50 and 60), a current limiting resistance element (70) and an SCR (Silicon Controlled Rectifier, 80).

The power semiconductor element (30) and the fast switch (40) are connected in series to form a main circuit.

A serial connection between the SCR (80) and the first power fuse (50) is connected in parallel to a serial connection between the power semiconductor element (30) and the fast switch (40), and a serial connection between the current limiting resistance element (70) and the second power fuse (60) is connected in series to the first power fuse (50). These connections of the SCR (80), the first and second power fuses (50 and 60) and the current limiting resistance element (70) form the current limiting circuit.

The measurement unit (10) measures a current and current accruement. The measurement unit (10) preferably includes a CT (Current Transformer) and a Rogowski coil. The CT and the Rogowski coil are well known in the art such that no more explanation thereto will be provided herein and omitted.

In a case where the measurement unit (10) measures a current accruement to detect a failure, that is, in a case where a fault current is introduced, the FFD (20) transmits a turn-on signal turning on the SCR (80) to the SCR (80), transmits an open signal opening the fast switch (40) to the fast switch (40) and transmits a turn-off signal turning off the power semiconductor element (30) to the power semiconductor element (30), details of which will be described later.

The power semiconductor element (30) maintains an ON state in normal times, but receives the turn-off signal from the FFD (20) and is switched to a OFF state, in a case where the fault current is introduced. The power semiconductor element (30) may be any one of an integrated gate communicated thyristor (IGBT), a gate turn-off thyristor (GTO), and an insulated gate bipolar transistor (IGCT), but it is not limited thereto.

The fast switch (40) configured to maintain insulation at a fast speed serves to protect the power semiconductor element (30). The fast switch (40) receives an open signal from the FFD (20) to open a main circuit at a fast speed, in a case where the fault current is introduced.

The SCR (80) configured to form the current limiting circuit is completed in turning-on prior to turn-off of the power semiconductor element (30). The SCR (80) is generally conductive at an instantaneous value of 50 kA or more currents. The SCR (80) functions as a power switch. Although the present disclosure has illustrated the SCR (80) that functions as a power switch, the application of power switch is not limited to the SCR (80), and application of other elements capable of functioning as a power switch is not ruled out. For example, the power switch may be a contact type contact point. At this time, the meaning of the SCR (80) being turned on defines that a fault current flows in the current limiting circuit due to a difference in impedances between a main circuit and the current limiting circuit.

The first power fuse (50) connected in parallel with the current limiting resistance element (70) is formed to initially cut off the fault current introduced into the current limiting circuit, and bypasses the fault current to the current limiting resistance element (70).

The first power fuse (50) may be designed to cut off a large fault current. The first power fuse (50) initially cuts off the fault current introduced into the current limiting circuit, where the moment the first power fuse (50) is fused, the fault current is detoured to the current limiting resistance element (70).

The second power fuse (60) connected to the current limiting resistance element (70) in series also cuts off the fault current introduced into the current limiting circuit and cuts off the fault current passing the current limiting resistance element (70). The second power fuse (60) may be designed to cut off a small fault current over the first power fuse (50). The fault current introduced into the second power fuse (60) is a residual current after the first power fuse (50) is fused and heated by the current limiting resistance element (70).

Although the first and second power fuses (50, 60) are elements having the same function, the first power fuse (50) functions to bypass the fault current to the current limiting resistance element (70), while the second power fuse (60) functions to completely cut off the fault current. The physical structure of the power fuses is well known in the art, such that no further explanation will be given thereto.

The current limiting resistance element (70) is a resistor limiting the introduced fault current to cut off the fault current in association with the second power fuse (60). Size of the impedance in the current limiting resistance element (70) is determined in consideration of cooperative operation with the second power fuse (60).

Figure 5A:
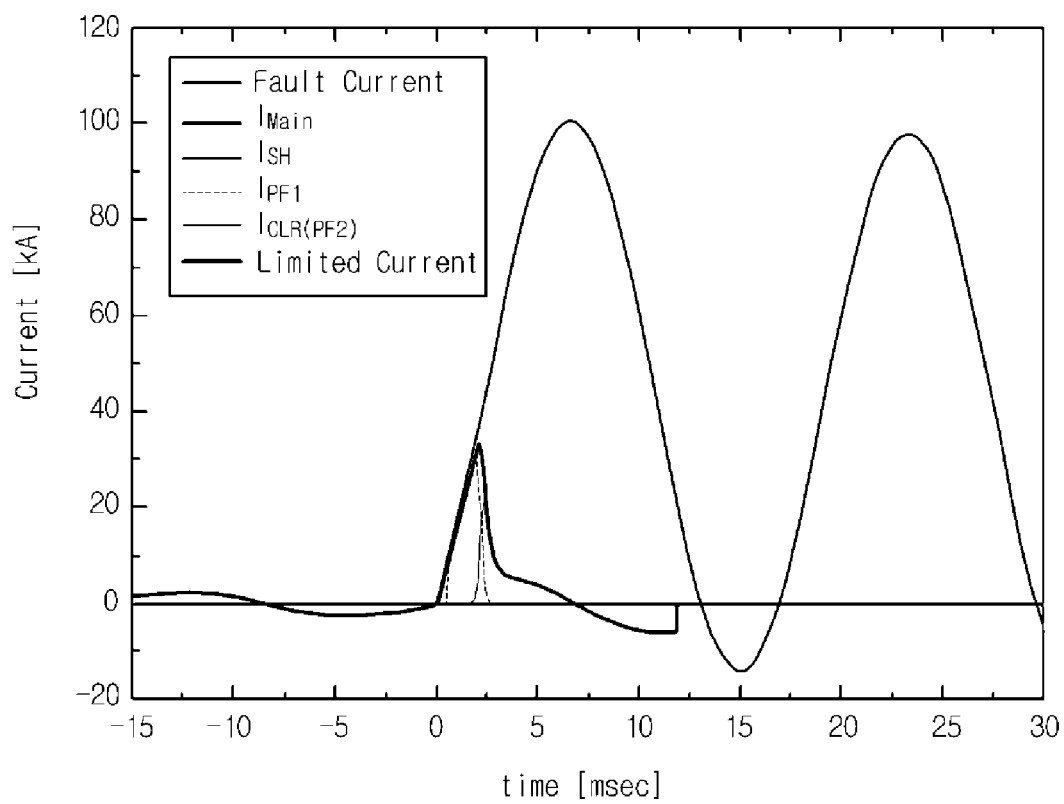
FIG. 5a is a graph illustrating a current flowing in the fault current limiter of FIG. 4 according to an exemplary embodiment of the present disclosure.

Now, a detailed operation of the fault current limiter according to the present disclosure will be described with reference to the accompanying drawing. FIG. 5a is a graph illustrating a current flowing in the fault current limiter of FIG. 4 according to an exemplary embodiment of the present disclosure, and FIG. 5b is an enlarged view of a part in FIG. 5a according to an exemplary embodiment of the present disclosure.

First, all the currents pass the main circuit including the power semiconductor element (30) and the fast switch (40) in normal times, the current limiting circuit including the first and second power fuses (50 and 60) and the current limiting resistance element (70) is blocked of a current because the SCR (80) is turned off. The measurement unit (10) serves to continuously measure a current.

In a case where the measurement unit (10) detects occurrence of a fault current, the FFD (20) detects the fault current at a fast speed based thereon, transmits a turn-on signal to the SCR (80) to turn on the SCR (80).

Figure 5B:
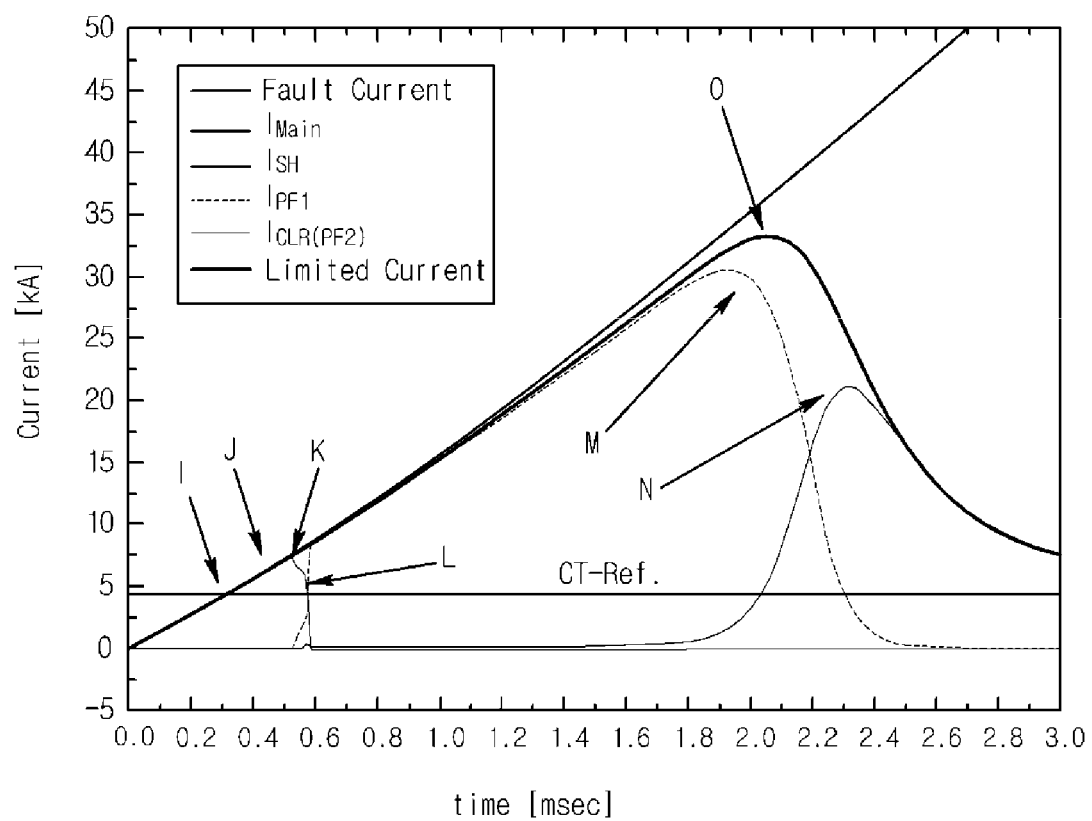
FIG. 5b is an enlarged view of a part in FIG. 5a according to an exemplary embodiment of the present disclosure.

'I' in FIG. 5b defines a moment when a fault current is detected. 'J' in FIG. 5b illustrates a moment when the SCR (80) is turned on. The meaning of the SCR (80) being turned on defines that a fault current flows to the current limiting circuit by a difference in impedances between the main circuit and the current limiting circuit.

Furthermore, the FFD (20) transmits an open signal opening a contact point of the fast switch (40), whereby the contact point of the fast switch (40) is opened. The moment the contact point of the fast switch (40) is opened, an arc current flows across the contact point to increase the fault current toward the current limiting circuit in response to the arc impedance, whereby the fault current at the main circuit is slowed or weakened in its uptrend.

Still furthermore, the FFD (20) transmits a turn-off signal turning off the power semiconductor element (30) in the course of opening the fast switch (40), whereby the power semiconductor element (30) is turned off.

'K' in FIG. 5b illustrates a moment when the fast switch (40) is opened. At this time, the main circuit is cut off to quench a contact point arc current of the fast switch (40). 'L' illustrates that the fault current is completely diverted to the current limiting circuit.

Subsequently, the fault current flows to the current limiting circuit, and after a predetermined period of time, the first power fuse (50) is melted, where 'M' defines the moment of the first power fuse (50) is melted or fused.

At the same time the first power fuse (50) is fused, the fault current flows to the current limiting resistance element (70), where 'O' illustrates a moment from which the current-limit is started by the current limiting resistance element (70). It can be noted that the fault current is limited in response to the impedance size of the current limiting resistance element (70).

The fault current having passed the current limiting resistance element (70) flows in the second power fuse (60), where 'N' in FIG. 5b illustrates a moment the second power fuse (60) starts to melt.

As apparent from the foregoing, the fault current limiter is excellent in limiting effect of fault current and easy in control by adopting only the power semiconductor element (30) instead of superconductors.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. A fault current limiter comprising:
a first switch;
a second switch;
a power semiconductor element serially connected to the second switch;
a detector configured to
detect an inflow of a fault current, and
when the fault current is detected, transmit a turn-on signal to the first switch, a turn-off signal to the power semiconductor element, and an open signal to the second switch,
wherein the power semiconductor element is changed to an OFF state by the turn-off signal, and
wherein the first switch is configured to form a current limiting circuit upon being switched to an ON state by the turn-on signal,
wherein the second switch is configured to open a contact point in response to the open signal in order to protect the power semiconductor element against the fault current;
a first power fuse serially connected with the first switch and configured to temporarily cut off the fault current upon detection of the fault current by the detector,
wherein the serial connection of the first switch and the first power fuse is connected in parallel to the serial connection of the power semiconductor element and the second switch; and
a resistance element configured to block the fault current; and
a second power fuse serially connected to the resistance element and configured to cut off any fault current passing the resistance element,
wherein the serial connection of the resistance element and the second power fuse is connected to the first power fuse in parallel.

2. The fault current limiter of claim 1, further comprising:
a measurement unit operatively connected to the detector and configured to measure an inflow current,
wherein the detector is configured to detect the inflow of the fault current from the inflow current measured by the measurement unit.

3. The fault current limiter of claim 2, wherein the measurement unit includes a current transformer and a Rogowski coil.

4. The fault current limiter of claim 1, wherein the detector is configured to transmit the turn-on signal prior to transmitting the open signal.

5. The fault current limiter of claim 1, wherein the detector transmits the open signal prior to the turn-off signal.

6. The fault current limiter of claim 1, wherein the power semiconductor element includes any one of an integrated gate communicated thyristor (IGBT), a gate turn-off thyristor (GTO), and an insulated gate bipolar transistor (IGCT).

7. The fault current limiter of claim 1, wherein the first switch includes any one of an SCR (Silicon Controlled Rectifier) and a contact type contact point.

* * * * *